US010627623B2

(12) United States Patent
Schrader (10) Patent No.: US 10,627,623 B2
(45) Date of Patent: Apr. 21, 2020

(54) IMAGE PROVIDING APPARATUS, METHOD AND COMPUTER PROGRAM

(75) Inventor: Martin Schrader, Tampere (FI)

(73) Assignee: Nokia Technologies Oy, Espoo (FI)

( * ) Notice: Subject to any disclaimer, the term of this patent is extended or adjusted under 35 U.S.C. 154(b) by 303 days.

(21) Appl. No.: 14/398,347

(22) PCT Filed: May 3, 2012

(86) PCT No.: PCT/IB2012/052228
§ 371 (c)(1),
(2), (4) Date: Feb. 3, 2015

(87) PCT Pub. No.: WO2013/164665
PCT Pub. Date: Nov. 7, 2013

(65) Prior Publication Data
US 2015/0138248 A1   May 21, 2015

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/017* (2013.01); *G06F 3/013* (2013.01); *G09G 5/10* (2013.01); *G02B 5/18* (2013.01); *G02B 27/42* (2013.01); *G02B 2027/014* (2013.01);
(Continued)

(58) Field of Classification Search
CPC .... G09G 2360/14; G02B 5/18; G02B 5/1814; G02B 5/1819; G02B 5/1828; G02B 5/1842; G02B 26/08; G02B 26/0808; G02B 26/0816; G02B 27/0081; G02B 27/0093; G02B 27/01; G02B 27/017; G02B 27/0172; G02B 27/0179; G02B 27/42; G02B 2027/0138; G02B 2027/014;
(Continued)

(56) References Cited

U.S. PATENT DOCUMENTS 4,401,367 A * 8/1983 Grantham ............ G02B 5/1857
359/571
5,513,041 A  4/1996 Togino ........................ 359/630
(Continued)

FOREIGN PATENT DOCUMENTS

CN  101460084 A  6/2009
CN  101460883 A  6/2009
(Continued)

OTHER PUBLICATIONS

Fukaya N et al. *Eye-Position Tracking Type Electro-Holographic Display Using Liquidcrystal Devices* Jan. 1, 1995, pp. 963/964, XP002940561.

*Primary Examiner* — Jason M Mandeville
(74) *Attorney, Agent, or Firm* — Harrington & Smith (57) ABSTRACT

An apparatus, method and computer program wherein the apparatus includes an optical arrangement including an image source and an exit pupil wherein the exit pupil is configured to be positioned proximate to an eye of a user to enable a user to view an image from the image source; and wherein the apparatus is configured to control a size and location of the exit pupil of the optical arrangement in response to a determination of a size and location of a pupil of the eye.

20 Claims, 7 Drawing Sheets

(51) Int. Cl.
*G06F 3/01* (2006.01)
*G09G 5/10* (2006.01)
*G02B 27/42* (2006.01)
*G02B 5/18* (2006.01)

(52) U.S. Cl.
CPC ............ *G02B 2027/0138* (2013.01); *G02B 2027/0154* (2013.01); *G02B 2027/0187* (2013.01); *G09G 2360/14* (2013.01); *G09G 2360/16* (2013.01)

(58) Field of Classification Search
CPC .... G02B 2027/0154; G02B 2027/0178; G02B 2027/0187
USPC ................................................................ 345/8
See application file for complete search history.

(56) References Cited

U.S. PATENT DOCUMENTS

| | | | | |
|---|---|---|---|---|
| 5,923,477 | A | 7/1999 | Togino | 359/631 |
| 5,991,103 | A | 11/1999 | Togino | 359/834 |
| 5,993,000 | A | 11/1999 | Kobayashi | 351/211 |
| 6,204,829 | B1 | 3/2001 | Tidwell | 345/7 |
| 6,407,724 | B2* | 6/2002 | Waldern | H01Q 1/50 174/138 A |
| 7,053,925 | B2* | 5/2006 | Payne | G02B 27/225 348/42 |
| 7,564,630 | B2* | 7/2009 | Kobayashi | G02B 26/105 359/630 |
| 7,637,616 | B2* | 12/2009 | Watanabe | G02B 27/0081 351/211 |
| 7,843,638 | B2* | 11/2010 | Watanabe | G02B 6/0026 359/15 |
| 8,254,031 | B2* | 8/2012 | Levola | G02B 27/0081 359/13 |
| 8,360,583 | B2* | 1/2013 | Watanabe | G02B 5/1828 345/32 |
| 8,508,848 | B2* | 8/2013 | Saarikko | G02B 5/1814 359/567 |
| 8,548,290 | B2* | 10/2013 | Travers | G02B 27/0081 359/34 |
| 8,681,423 | B1* | 3/2014 | Gibson | G02B 6/0035 349/196 |
| 2001/0011968 | A1 | 8/2001 | Tidwell | 345/8 |
| 2001/0043163 | A1* | 11/2001 | Waldern | G02B 5/1885 345/7 |
| 2002/0041259 | A1 | 4/2002 | Lewis | 345/7 |
| 2002/0051118 | A1 | 5/2002 | Takagi | 351/211 |
| 2002/0167462 | A1* | 11/2002 | Lewis | G02B 27/0093 345/7 |
| 2004/0021768 | A1* | 2/2004 | Payne | G02B 27/225 348/51 |
| 2004/0108971 | A1* | 6/2004 | Waldern | G02B 27/0093 345/8 |
| 2004/0239584 | A1* | 12/2004 | Edelmann | G02B 27/0081 345/8 |
| 2006/0168859 | A1* | 8/2006 | Pombo | G02B 7/023 40/611.07 |
| 2007/0171370 | A1* | 7/2007 | Watanabe | G02B 27/0081 351/211 |
| 2008/0117341 | A1 | 5/2008 | McGrew | |
| 2008/0212195 | A1 | 9/2008 | Yamamoto | 359/630 |
| 2009/0005961 | A1* | 1/2009 | Grabowski | G01C 21/365 701/532 |
| 2010/0078546 | A1* | 4/2010 | Kyoung | G02B 6/4249 250/225 |
| 2010/0079865 | A1* | 4/2010 | Saarikko | G02B 6/0016 359/566 |
| 2010/0097580 | A1 | 4/2010 | Yamamoto | 359/630 |
| 2010/0103078 | A1* | 4/2010 | Mukawa | G02B 27/0172 345/8 |
| 2010/0149073 | A1 | 6/2010 | Chaum | 345/8 |
| 2010/0277803 | A1* | 11/2010 | Pockett | G02B 27/0172 359/567 |
| 2010/0284085 | A1* | 11/2010 | Laakkonen | G02B 6/12007 359/575 |
| 2010/0302276 | A1* | 12/2010 | Levola | G06F 3/1431 345/649 |
| 2010/0302499 | A1 | 12/2010 | Watanabe | 349/201 |
| 2011/0096401 | A1* | 4/2011 | Levola | G02B 6/0016 359/573 |
| 2011/0242635 | A1* | 10/2011 | Oka | G02B 27/0172 359/207.7 |
| 2013/0051730 | A1* | 2/2013 | Travers | G02B 27/01 385/37 |
| 2013/0182334 | A1* | 7/2013 | Sugihara | G02B 27/0172 359/630 |

FOREIGN PATENT DOCUMENTS

| | | |
|---|---|---|
| DE | 102010041344 A1 | 3/2012 |
| WO | WO 01/33282 A1 | 5/2001 |
| WO | WO 2007/141588 A1 | 12/2007 |
| WO | WO 2008/081070 A1 | 7/2008 |
| WO | WO-2011/051660 A1 | 5/2011 |

\* cited by examiner

IMAGE PROVIDING APPARATUS, METHOD AND COMPUTER PROGRAM

TECHNOLOGICAL FIELD

Embodiments of the present disclosure relate to an image providing apparatus, method and computer program. In particular, they relate to an image providing apparatus, method and computer program which may be used in a device such as a near eye display.

BACKGROUND

Devices such as near eye displays are known. Such devices enable images from image sources such as displays or scanners to be provided proximate to the eye of a user.

The relative positions of the eyes of the user may differ between the different users of such devices. Also the users may move their eyes during the use of the device, for example, they may change the direction in which they are looking. The relative positions of the eyes of the user and the near eye display may also change during use if, for example, the device moves on the head of the user.

Exit pupil expanders may be used to increase the size of an exit pupil in such devices. This may ensure that light originating from the image source is always incident on the pupil of the eye of the user even when the user moves the eyes and allowing for differences in the distances between eyes of different uses. However this may be inefficient as light may be wasted during the expansion process.

Therefore it may be beneficial to provide a more efficient device.

BRIEF SUMMARY

According to some, but not necessarily all, exemplary embodiments of the disclosure there may be provided an apparatus comprising: an optical arrangement comprising an image source and an exit pupil wherein the exit pupil is configured to be positioned proximate to an eye of a user to enable a user to view an image from the image source; and wherein the apparatus is configured to control a size and location of the exit pupil of the optical arrangement in response to a determination of a size and location of a pupil of the eye.

In some embodiments the image source may comprise at least one display.

In some embodiments the apparatus may comprise a mechanism for moving the optical arrangement relative to the eye of the user to enable the size and location of the exit pupil to be controlled.

In some embodiments the optical arrangement may comprise a mirror and a mechanism for moving the mirror relative to the eye of the user to enable the size and location of the exit pupil to be controlled.

In some embodiments the optical arrangement may comprise at least one light guide element which may be configured to provide an exit pupil proximate the eye of a user.

In some embodiments the light guide element may comprise one or more diffraction gratings. The diffraction grating may be located on a substrate overlaying the light guide element and may be configured to allow the substrate to move relative to the light guide element. The light guide element may comprise a mask which may be configured to at least partially cover the diffraction grating wherein the mask may be configured to allow the position of a diffractive portion of the mask to be moved relative to the diffraction grating.

In some embodiments the apparatus may be configured to control a size and location of the exit pupil of the optical arrangement by controlling the size and location of a diffraction grating.

In some embodiments the apparatus may comprise a detector configured to detect a size and location of a pupil of the eye. In some embodiments the detector may comprise an image capturing device configured to capture an image of the eye. The image capturing device may comprise a video image capturing device. The detector may comprise a processor configured to analyze images captured by the image capturing device to determine a size and location of the pupil of the eye. The detector may comprise a light source configured to illuminate the eye of the user using infrared light.

According to some, but not necessarily all, exemplary embodiments of the disclosure there may also be provided a method comprising: controlling a size and location of an exit pupil of an optical arrangement wherein the exit pupil is configured to be positioned proximate to an eye of a user to enable a user to view an image from an image source; and wherein the apparatus is configured to control the size and location of an exit pupil in response to a determination of a size and location of a pupil of the eye.

In some embodiment the image source may comprise at least one display.

In some embodiments controlling the size and location of an exit pupil may comprise moving the optical arrangement relative to the eye of the user.

In some embodiments controlling the size and location of an exit pupil may comprise moving a mirror relative to the eye of the user.

In some embodiments the optical arrangement may comprise at least one light guide element which may be configured to provide an exit pupil proximate the eye of a user. The light guide element may comprise at least one diffraction grating. The at least one diffraction grating may be located on a substrate overlaying the light guide element and controlling the size and location of an exit pupil may comprise moving the substrate relative to the light guide element. The light guide element may also comprise a mask which may be configured to at least partially cover the diffraction grating and controlling the size and location of an exit pupil may comprise moving a position of a diffractive portion of the mask relative to the diffraction grating.

In some embodiments controlling the size and location of an exit pupil may comprises changing a shape of the deformable substrate to control the size and location of a diffraction grating.

In some embodiments the method may further comprise detecting a size and location of a pupil of the eye. Detecting a size and location of a pupil of the eye may comprise capturing an image of the eye. In some embodiments detecting a size and location of a pupil of the eye may comprise capturing a video image of the eye.

In some embodiments detecting a size and location of a pupil of the eye may comprise analyzing captured images to determine a size and location of the pupil of the eye.

In some embodiments detecting a size and location of a pupil of the eye may comprise illuminating the eye using an infrared light source.

According to some, but not necessarily all, exemplary embodiments of the disclosure there may also be provided a computer program comprising computer program instructions that, when executed by at least one processor, cause an apparatus at least to perform: controlling a size and location of an exit pupil of an optical arrangement wherein the exit pupil is configured to be positioned proximate to an eye of a user to enable a user to view an image from the image source; and wherein the apparatus is configured to control the size and location of the exit pupil in response to a determination of a size and location of a pupil of the eye.

In some embodiments there may also be provided a computer program comprising program instructions for causing a computer to perform any of the methods described above.

In some embodiments there may also be provided a physical entity embodying any of the computer programs described above.

In some embodiments there may also be provided an electromagnetic carrier signal carrying any of the computer programs described above.

According to some, but not necessarily all, exemplary embodiments of the disclosure there may also be provided an apparatus comprising: at least one processor; and at least one memory including computer program code; wherein the at least one memory and the computer program code are configured to, with the at least one processor, enable the apparatus to: control a size and location of an exit pupil of an optical arrangement wherein the exit pupil is configured to be positioned proximate to an eye of a user to enable a user to view an image from the image source; and wherein the apparatus is configured to control the size and location of the exit pupil in response to a determination of a size and location of a pupil of the eye.

In some embodiments the image source may comprise at least one display.

The apparatus may be for providing an image to a user. In some embodiments of the disclosure the apparatus may be for providing an image to a user in a virtual reality or augmented reality application.

BRIEF DESCRIPTION

For a better understanding of various examples of embodiments of the present disclosure reference will now be made by way of example only to the accompanying drawings in which.

DETAILED DESCRIPTION

The Figures illustrate an apparatus 1 comprising: an optical arrangement 3 comprising an image source 5 and an exit pupil 9 wherein the exit pupil 9 is configured to be positioned proximate to an eye 7 of a user to enable a user to view an image from the image source 5; and wherein the apparatus 1 is configured to control a size and location of the exit pupil 9 of the optical arrangement 3 in response to a determination of a size and location of a pupil 33 of the eye 7.

Figure 1:
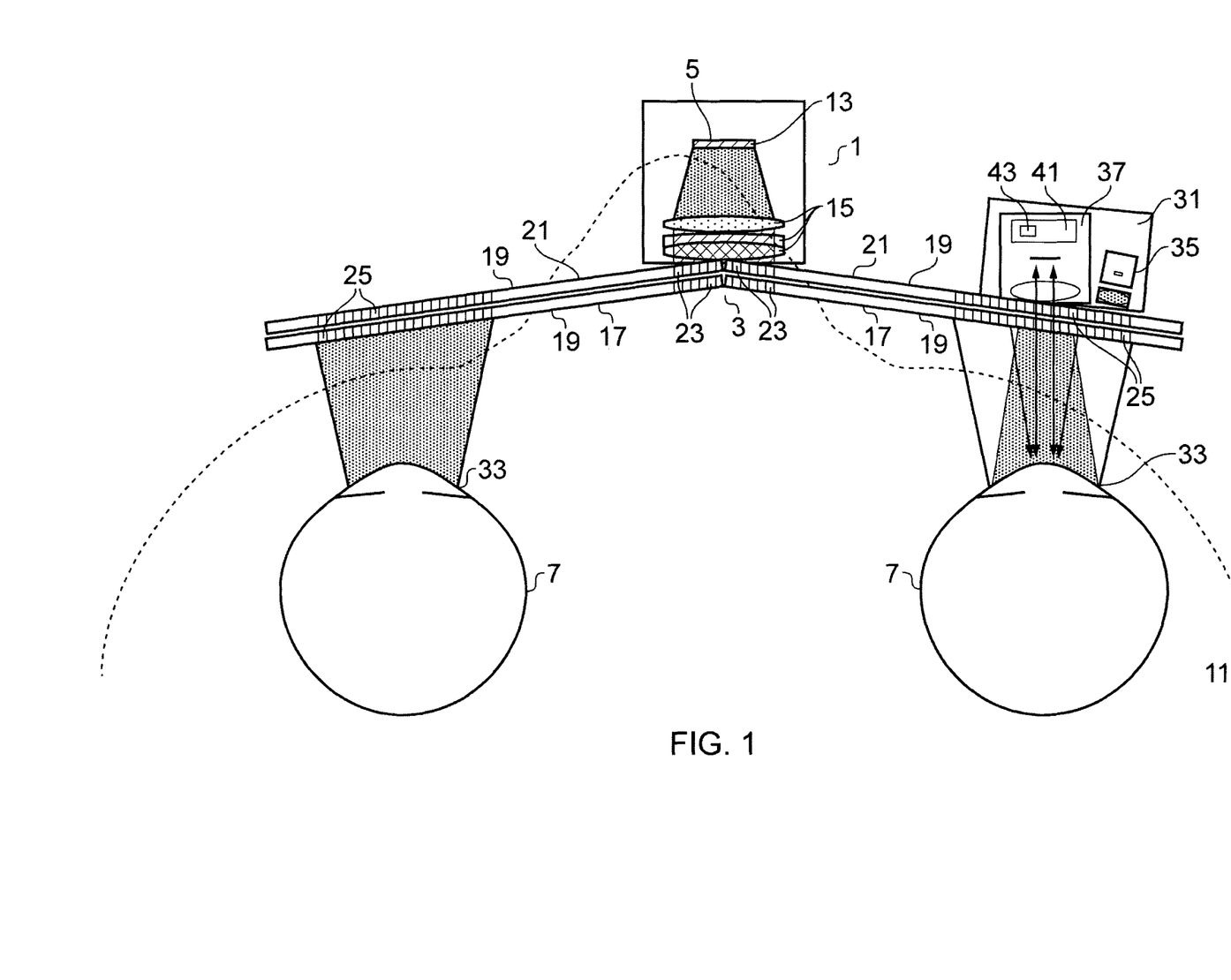
FIG. 1 illustrates a cross section of an apparatus according to an exemplary embodiment of the disclosure.

FIG. 1 schematically illustrates an apparatus 1 according to an exemplary embodiment of the disclosure. The apparatus 1 illustrated in FIG. 1 comprises a cross section through a portion of the apparatus 1. The cross section may be taken through a substantially horizontal plane when the apparatus 1 is in use.

The apparatus 1 may comprise a near eye display or other type of display which enables an image to be provided proximate to the eye 7 of the user. The apparatus 1 may be configured to provide a user with images which enable the user to use virtual reality or augmented reality applications.

In some embodiments of the disclosure the apparatus 1 may be configured to be worn by the user. For example the apparatus 1 may comprise a mounting portion such as a head piece. The mounting portion may enable the apparatus 1 to be mounted on the head or face of the user. When the apparatus 1 is mounted on the head or face of the user, the user's head or face may support the weight or at least a portion of the weight of the apparatus 1.

In FIG. 1 the apparatus 1 is illustrated positioned adjacent to the head of the user as it may be arranged during use. The cross section of the face of the user is illustrated by the dashed line 11 to provide an indication of how the apparatus 1 may be positioned in use.

The exemplary apparatus 1 illustrated in FIG. 1 comprises an optical arrangement 3. The optical arrangement comprises 3 an image source 5, one or more lenses 15 and at least one light guide element 17. The optical arrangement 3 is arranged so that in use the exit pupil 9 of the optical arrangement 3 is provided proximate to the eye 7 of the user. The exit pupil 9 is illustrated in FIGS. 2A to 6B.

The image source 5 may comprise any means which may generate an image. In some embodiments of the disclosure the image source 5 may comprise at least one display 13. In the exemplary embodiment of FIG. 1 one display 13 is provided. The display 13 may be provided in the centre of the apparatus 1 so that the images from the display 13 may be provided to both eyes 7 of the user. In other embodiments of the disclosure more than one display 13 may be provided. For example two displays 13 may be provided. In embodiments of the disclosure where two displays 13 are provided each display 13 may provide an image to a different eye 7.

The optical arrangement 3 may also comprise means for focusing the images provided by the display 13. In the exemplary embodiment illustrated in FIG. 1 the means for focusing the images comprises one or more lenses 15. In some embodiments of the disclosure the position of the lenses 13 relative to the display 15 may be adjusted.

The light guide elements 17 may comprise any means which may be configured to guide a light beam from the image source 5 or lenses 15 to a position proximate to the eye 7 of the user of the apparatus 1 to enable the user of the apparatus 1 to view an image provided by the image source 5.

The light guide element 17 may be positioned within the apparatus 1 so that when the user is using the apparatus 1, the light guide element 17 is positioned within a few centimetres of the eye 7 of the user. This may enable the exit pupil 9 of the optical arrangement 3 to be positioned proximate to the eye 7 of the user.

In the embodiments of the disclosure illustrated in FIG. 1 the light guide elements 17 comprise two substrates 19. It is to be appreciated that in other embodiments of the disclosure other the light guide elements 17 may comprise a different number of substrates 19.

In the exemplary embodiment of FIG. 1 the substrates 19 are flat. In other embodiments of the disclosure the substrates 19 may be a different shape, for example, the substrates 19 may be curved.

In the exemplary embodiment illustrated in FIG. 1 the two substrates 19 are positioned overlaying each other. In the exemplary embodiment illustrated in FIG. 1 the two substrates 19 are positioned overlaying each other so that the surfaces of each of the substrates 19 are parallel with the surfaces of the other substrates 19. In other embodiments of the disclosure the substrates 19 may be arranged in a different configuration.

The substrates 19 may be made of any suitable material which enables the beam of light 5 to be transmitted through the substrate 19. For example, the substrate 19 may be made of glass or plastic.

In the exemplary embodiment illustrated in FIG. 1 the light guide elements 17 comprise an exit pupil expander 21. The exit pupil expander 21 may comprise means for increasing the size of the exit pupil 9 of the optical arrangement 3. The exit pupil expander 21 may be configured to increase the size of the exit pupil 9 of the optical arrangement 3 so that the exit pupil 9 of the optical arrangement 9 may be larger than the exit pupil of the image source 5 or lenses 15. It is to be appreciated that other types of light guide elements 17 could be used in other embodiments of the disclosure.

Each of the substrates 19 of the exit pupil expander 21 illustrated in FIG. 1 comprises a first diffraction grating 23 and a second diffraction grating 25. The diffraction gratings 23, 25 may comprise any suitable periodic structure. The first diffraction grating 25 may be an in-coupling grating which couples an incident beam of light into the substrate 19. The incident beam of light may be provided by the one or more lenses 15 of the optical arrangement 3. The second diffraction grating 25 may be an out-coupling grating which couples the beam of light out of the substrate 19.

The first diffraction grating 23 and the second diffraction grating 25 may have different sizes. In the exemplary embodiment of FIG. 1 the second diffraction grating 25 may be larger than the first diffraction grating 23 such that it covers a larger area of the surface of the substrate 19. This may cause expansion of the exit pupil of the beam of light. The sizes and period of the diffraction gratings 23, 25 may be selected to enable a focused image to be provided to the user of the apparatus 1.

The thickness of the substrate 19 which is used may be dependent upon the width of the diffraction gratings 23, 25 which are used and the proximity of the light guide element 19 to the eye 7 of the user.

In the exemplary embodiment in FIG. 1 the first diffraction grating 23 is arranged so that a beam of light from the lenses 15 or image source 5 is incident on the first diffraction grating 23. The first diffraction grating 23 couples the incident beam of light into the substrate 19. In the embodiment illustrated in FIG. 1 in-coupled beam of light propagates through the substrate 19. The exit pupil expander 21 is configured to enable total internal reflection of the in-coupled beam of light. This means that the in-coupled beam of light remains inside the substrate 19 until it is incident upon the second diffraction grating 25.

The second diffraction grating 25 may be configured to diffract the in-coupled beam of light out of the substrate 19 to provide an out-coupled beam of light. As the light guide element 17 of FIG. 1 comprises an exit pupil expander 21 the out-coupled beam of light may have a larger exit pupil than the beam of light which is provided by the image source 5 or lenses 15.

In the exemplary embodiment illustrated FIG. 1 two diffraction gratings 23, 25 are provided on each of the substrates 19. It is to be appreciated that in other embodiments of the disclosure any number of diffraction gratings 23, 25 may be provided on each of the substrates 19.

It is also to be appreciated that any suitable means may be used to couple the light in and/or out of the light guide element 7. In the exemplary embodiment illustrated FIG. 1 diffraction gratings 23, 25 are used, however in other embodiments of the disclosure non-diffractive optical components such as prisms may be used.

The apparatus 1 may be configured so that the size and location of the exit pupil 9 may be controlled. The apparatus 1 may comprise any suitable control means which may enable the size and/or location of the exit pupil 9 to be controlled. The means for enabling the size and/or location of the exit pupil 9 to be controlled may comprise mechanical means which may be configured to move one or more elements of the optical arrangement 3. In some embodiments the means for enabling the size and/or location of the exit pupil 9 to be controlled may comprise electrical means which may enable an electrical signal to be provided to the optical arrangement 3 which may change the optical properties of one or more elements of the optical arrangement 3. The means for enabling the size and/or location of the exit pupil 9 to be controlled may comprise any one or more of the exemplary means described below with reference to FIGS. 2A to 6B.

The apparatus illustrated in FIG. 1 also comprises a detector 31. The detector 31 may comprise any means which may enable the size and location of the pupil 33 of an eye 7 of a user to be determined. The detector 7 may also comprise any means which may enable the information relating to the determined size and location of the pupil 33 of an eye 7 of the user to be provided to the means for controlling the size and location of the exit pupil 9. This may enable the size and location of the exit pupil 9 to be changed or controlled in response to the determination of the size and location of the pupil 33 of the eye 7 of the user.

In the exemplary embodiment illustrated in FIG. 1 the detector 31 comprises a light source 35. The light source 35 may comprise any suitable means for illuminating the eye 7 of the user. The light source 35 may be positioned such that light emitted by the light source 35 may be incident on the surface of the eye 7 of the user.

In some embodiments of the disclosure the light source 35 may provide light from a non-visible portion of the spectrum. In some embodiments of the disclosure the light source 35 may provide infrared light. In other embodiments of the disclosure other types of light may be used instead.

The detector 31 of the exemplary embodiment of FIG. 1 also comprises an image capturing device 37. The image capturing device 37 captures an image of the user's eye 7. In some embodiments of the disclosure the image capturing device 37 may be configured to capture a video of the eye of the user 7.

In some embodiments of the disclosure the image capturing device 37 may be configured to use infrared light to capture the images.

In some exemplary embodiments of the disclosure the detector 31 may be configured to enable the images or video images captured by the image capturing device 37 to be analyzed. The analysis of the images may enable the size and location of the pupil 33 of the eye 7 of the user to be determined. The analysis may be performed by any suitable means such as a processor 41 loaded with suitable computer program code 43.

In the exemplary embodiment illustrated in FIG. 1 the processor 41 is located within the detector 31. It is to be appreciated that in other embodiments of the disclosure the processor 41 may be located remotely from the detector 31. In such embodiments the detector 31 may be configured to communicate with the processor 41 via a communication link to enable the processor 41 to obtain information indicative of the captured images. The communication link may be any suitable communication link such as a wired or wireless communication link.

In the exemplary embodiment illustrated in FIG. 1 only one detector 31 has been illustrated. The detector 31 illustrated in FIG. 1 is configured to detect the size and position of the pupil 33 of the right eye 7 of the user. In other embodiments of the disclosure two detectors 31 may be provided so that the size and position of the pupils 33 of both of the eyes 7 of the user may be detected. In other embodiments a single detector 31 may be configured to detect the size and position of the pupils 33 of both of the eyes 7 of the user.

Once the size and position of the pupil 33 of the eye 7 of the user has been determined information relating to the determined size and position of the pupil 33 of the eye 7 of the user may be provided to the means for enabling the size and location of the exit pupil 9 to be controlled. The size and location of the exit pupil 9 may be controlled so that it is aligned with the determined position of the pupil 33 of the user's eye 7. Various exemplary embodiments for controlling the size and location of the exit pupil 9 are illustrated in FIGS. 2A to 6B and described below.

Figure 2A:
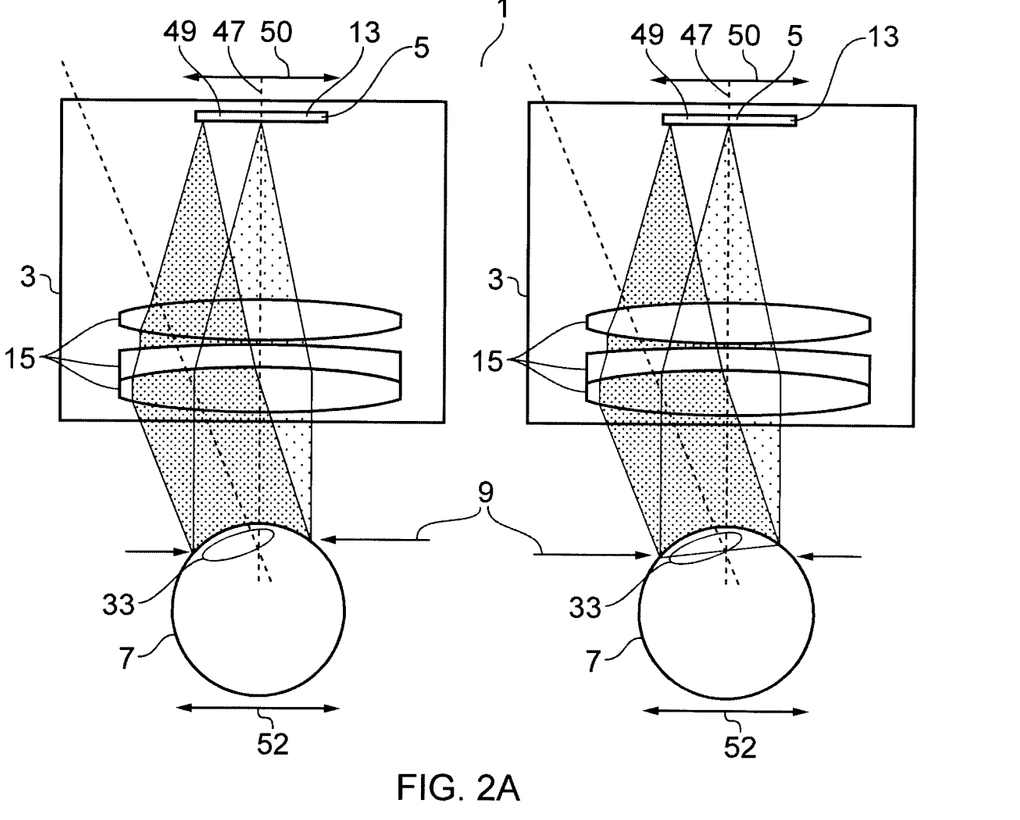
FIGS. 2A and 2B illustrate an apparatus according a second exemplary embodiment of the disclosure.
Figure 2B:
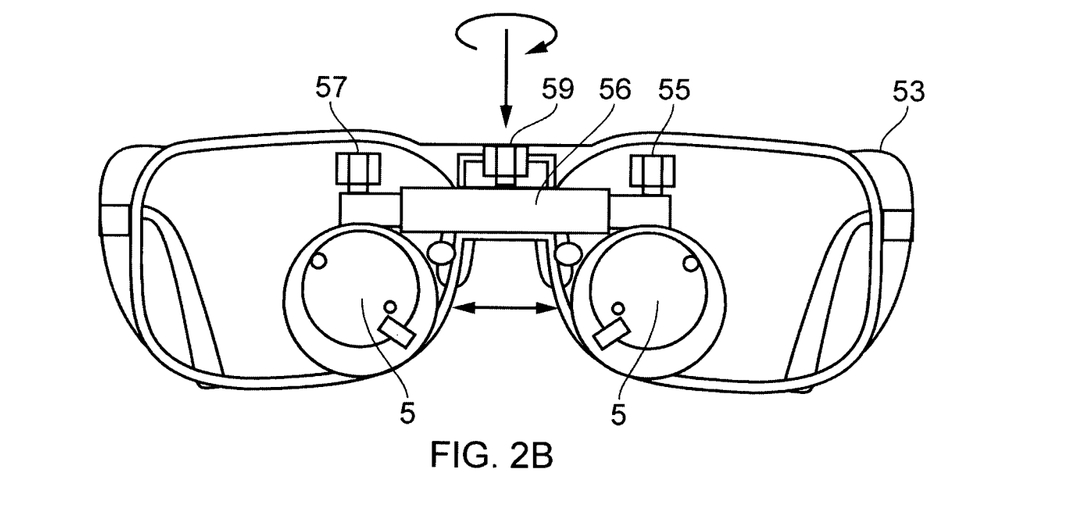

FIGS. 2A and 2B illustrate an apparatus 1 according a second exemplary embodiment of the disclosure. The detector 31 has not been illustrated in FIGS. 2A and 2B for clarity.

FIG. 2A schematically illustrates an apparatus 1 according to a second embodiment of the disclosure. In the exemplary embodiment of FIG. 2A the apparatus 1 comprises two optical arrangements 3. A first optical arrangement 3 may be provided proximate to the right eye 7 of the user and a second optical arrangement 3 may be provided proximate the left eye 7 of the user. Each of the optical arrangements 3 may comprise an image source 5 and one or more lenses 15 as described above in relation to FIG. 1.

In the exemplary embodiment illustrated in FIG. 2A no light guide elements 17 are illustrated. The beam of light provided by the one or more lenses 15 may be incident directly on the eye 7 of the user. It is to be appreciated that in other embodiments one or more light guide elements 17 or other optical components may be provided within the optical arrangements 3.

In the exemplary embodiment of the disclosure illustrated in FIG. 2A comprises means for moving the optical arrangements 3. The means for moving the optical arrangements 3 may comprise part of a means for controlling the size and location of the exit pupil 9. In FIG. 2A the optical arrangements 3 may be moved relative to the positions of a head piece which may be used to mount the apparatus 1 to the head of a user. The means for moving the optical arrangements 3 as illustrated in FIGS. 2A and 2B may be combined with other means for controlling the size and/or location of the exit pupil such as those illustrated in FIGS. 3 to 6B and described below or any other suitable means.

In FIG. 2A a first exemplary position 47 and a second exemplary position 49 are illustrated. When the optical arrangement 3 is in the first exemplary position 47 the centre of the optical arrangement 3 is aligned with a center of the eye 7 of a user.

When the optical arrangement 3 is in the second exemplary position 49 the centre of the optical arrangement 3 is positioned to the left of the center of the eye 7 of the user.

The movement of the optical arrangements 3 may enable the exit pupil 9 of the optical arrangement 3 to be moved. The exit pupil 9 of the optical arrangement 3 may be moved so that it is aligned with the pupil 33 of the eye 7 of the user. The optical arrangements 3 may be moved in response to the detection of the position of the pupils 33 so as to ensure that the exit pupil 9 remains in alignment with the pupil 33.

Only two positions of the optical arrangements 3 have been illustrated in FIG. 2A. It is to be appreciated that other positions could be used in other exemplary embodiments of the disclosure. For example the optical arrangements 3 could be positioned so that centre of the optical arrangements 3 are positioned to the right of the center of the eye 7 of the user as indicated by the arrows 50. This may enable the positions of the optical arrangements 3 to be aligned with the positions of the eyes 7 of the user as the eyes 7 move as indicated by arrows 52.

FIG. 2B illustrates an exemplary mechanism 51 for moving the optical arrangements 3. In FIG. 2B the apparatus 1 is coupled to a head piece 53. The head piece 53 may enable the apparatus 1 to be mounted on the head of a user. In the exemplary embodiment of FIG. 2B the head piece 53 resembles a pair of spectacles however it is to be appreciated that in other embodiments of the disclosure other types of head piece 53 may be used instead.

An image source 5 is provided on either side of the head piece 53. The image sources 5 may be located so that they are positioned in front of the eyes 7 of the user when the user wears the head piece 53.

In the exemplary embodiment of FIG. 2B the optical arrangements 3 are mounted on a horizontal member 56. The horizontal member 56 comprises a first screw portion 55 and a second screw portion 55. The first screw portion 55 is coupled to the image source 5 on the right hand side of the apparatus 1. The first screw portion 55 is arranged so that rotation of the first screw portion 55 causes the optical arrangement 3 on the right hand side of the apparatus 1 to be moved along the horizontal member 55. This causes movement of the optical arrangement 3 on the right hand side of the apparatus 1. Similarly the second screw portion 57 is arranged so that rotation of the second screw portion 57 causes the optical arrangement 3 on the left hand side of the apparatus 1 to be moved along the horizontal member 55 and so causes movement of the optical arrangement 3 on the left hand side of the apparatus 1.

In the exemplary embodiment of FIG. 2B a third screw portion 59 is provided. The third screw portion 59 may be coupled to the horizontal member 56 so that rotation of the third screw portion 59 may move the horizontal member 56 in a vertical direction. This may change the vertical position of both of the optical arrangements 3.

In some embodiments of the disclosure the screw portions 55, 57, 59 may be configured to be adjusted automatically. The screw portion may be adjusted automatically in response to an input signal indicative of a detected position of a user's pupils 33. The input signal indicative of a detected position of a user's pupils 33 may be received from a detector 31. This may enable the exit pupil 9 of the optical arrangement 3 to be aligned with the pupil 33 of the user's eye 7 without any deliberate input from the user.

FIGS. 2A and 2B illustrate a means for moving optical arrangements 3. This may enable the position of the exit pupil 9 of the optical arrangement 3 to be controlled. In other embodiments of the disclosure other means could be used which may also enable the size of the exit pupil 9 to be controlled. For example the one or more lenses 15 may be adjusted to control the size of the exit pupil 9.

Figure 3:
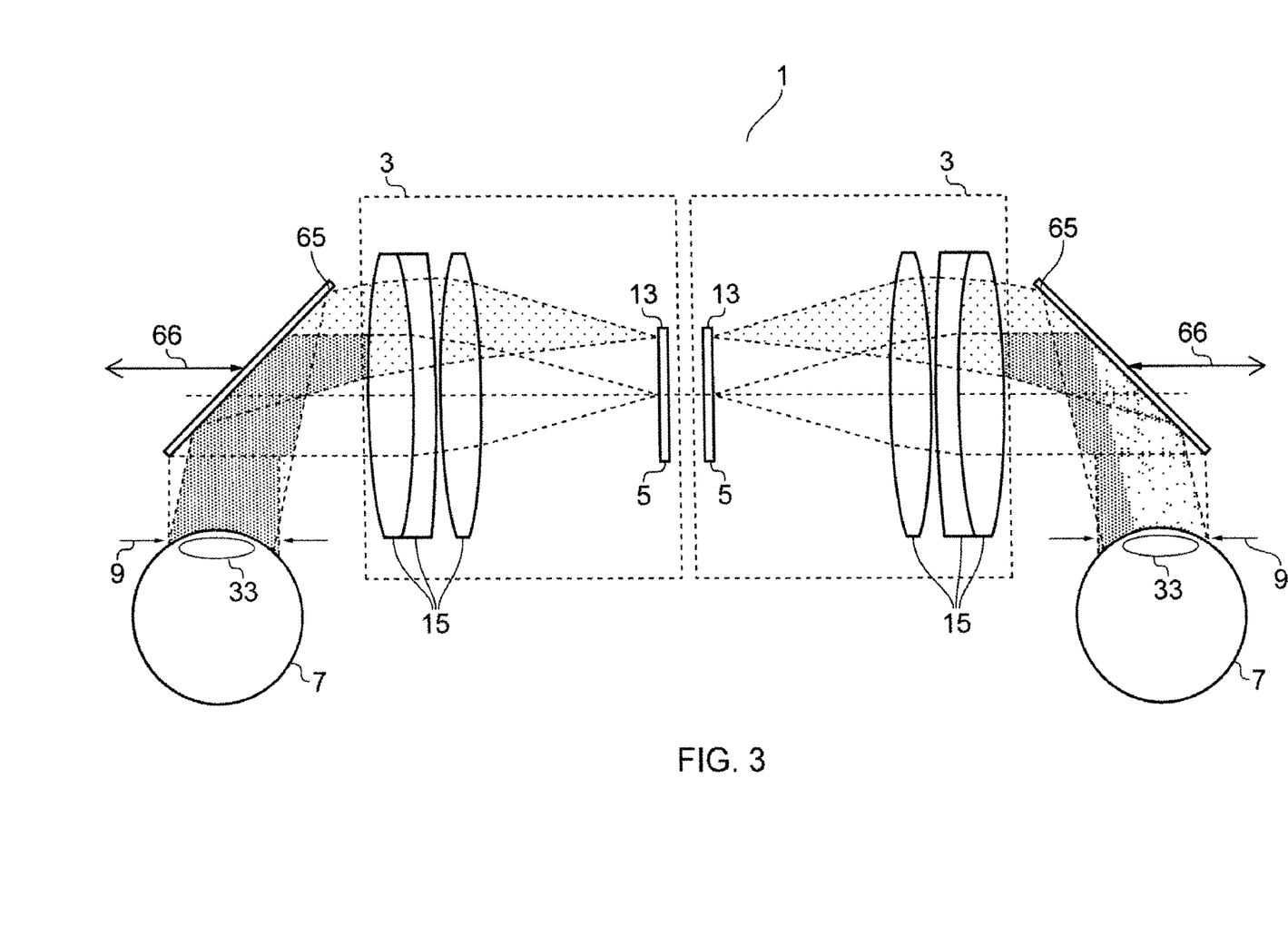
FIG. 3 illustrates an apparatus according to a third exemplary embodiment of the disclosure.

FIG. 3 schematically illustrates an apparatus 1 according to a third exemplary embodiment of the disclosure. The detector 31 has not been illustrated in FIG. 3 for clarity.

In the exemplary embodiment of FIG. 3 the apparatus 1 also comprises two optical arrangements 3. A first optical arrangement 3 may be provided proximate to the right eye 7 of the user and a second optical arrangement 3 may be provided proximate the left eye 7 of the user. Each of the optical arrangements 3 may comprise an image source 5 and one or more lenses 15.

As described above in relation to FIG. 1 the image sources 5 may be any suitable means such as a display 13. The one or more lenses 15 may be provided between the image source 5 and the eyes 7 of the user.

The optical arrangements 3 of the exemplary embodiment of FIG. 3 are arranged so the image sources 5 are arranged perpendicular to the surface of the eye 7 of the user. This differs from the embodiment of FIGS. 2A and 2B where the image sources are arranged parallel to the surface of the eye 7 of the user. It is to be appreciated that the image sources 5 could be arranged at any angle relative to the eye 7 of the user.

In the exemplary embodiment illustrated in FIG. 3 no light guide elements 11 are provided. It is to be appreciated that in other embodiments one or more light guide elements 11 or other optical components may be provided within the optical arrangements 3.

In the exemplary embodiment of FIG. 3 the optical arrangements 3 also comprise a mirror 65. The mirror 65 may comprise any means which may be configured to deflect the beam of light within the optical arrangement 3. In the exemplary embodiment of FIG. 3 a mirror 65 is provided in each optical arrangement 3. In the exemplary embodiment of FIG. 3 the mirror 65 may be arranged to deflect the beam of light toward the eye 7 of the user. In the exemplary embodiment of FIG. 3 the mirror 65 may be arranged to deflect the beam of light through an angle of 90 degrees. It is to be appreciated that in other embodiments of the disclosure the mirror 65 may be configured to deflect the beam of light through any other angle as may be needed. The angle though which the beam of light is deflected may depend upon the position of the image source 5 and mirror 65.

In the exemplary embodiment illustrated in FIG. 3 only one mirror 65 is provided in each optical arrangement 3. It is to be appreciated that in other embodiments of the disclosure more than one mirror 65 may be provided in either or each of the optical arrangements 3.

In the exemplary embodiment illustrated in FIG. 3 the means for controlling the size and location of the exit pupil 9 may comprise means for controlling the position of the mirrors 65. In some embodiments of the disclosure the means for controlling the size and location of the exit pupil 9 may comprise means for controlling the position of the mirrors 65 relative to the eye 7 of the user. In some embodiments of the disclosure the means for controlling the size and location of the exit pupil 9 may comprise means for moving the mirrors 65 in a direction as indicated by the arrows 66 in FIG. 3.

The means for controlling the position of the mirrors 65 may comprise any mechanism which enables the mirrors to be moved. For example the means may comprise a screw mechanism similar to the mechanism as illustrated in FIG. 2B and described above which may enable the vertical and/or horizontal position of the mirror to be adjusted. In some embodiments of the disclosure the means may also enable the angular position of the mirror 65 to be detected.

In the exemplary embodiment illustrated in FIG. 3 the means for controlling the size and location of the exit pupil 9 may also comprise means for moving the image sources 5 and one or more lenses 15. These means may comprise any suitable means such as those described above in relation to FIGS. 2A and 2B.

The apparatus 1 of FIG. 3 may be configured to enable the positions of the mirrors 65 to be adjusted automatically. The positions of the mirrors 65 may be adjusted automatically in response to an input signal indicative of a detected position of a user's pupils 33. The input signal indicative of a detected position of a user's pupils 33 may be received from a detector 31. This may enable the exit pupil 9 of the optical arrangement 3 to be aligned with the pupil 33 of the user's eye 7 without any deliberate input from the user.

FIG. 3 illustrates a means for moving a mirror 65 within an optical arrangement 3. This may enable the position of the exit pupil 9 of the optical arrangement 3 to be controlled. In other embodiments of the disclosure other means could be used which may also enable the size of the exit pupil 9 to be controlled. For example the one or more lenses 15 may be adjusted to control the size of the exit pupil 9.

Figure 4A:
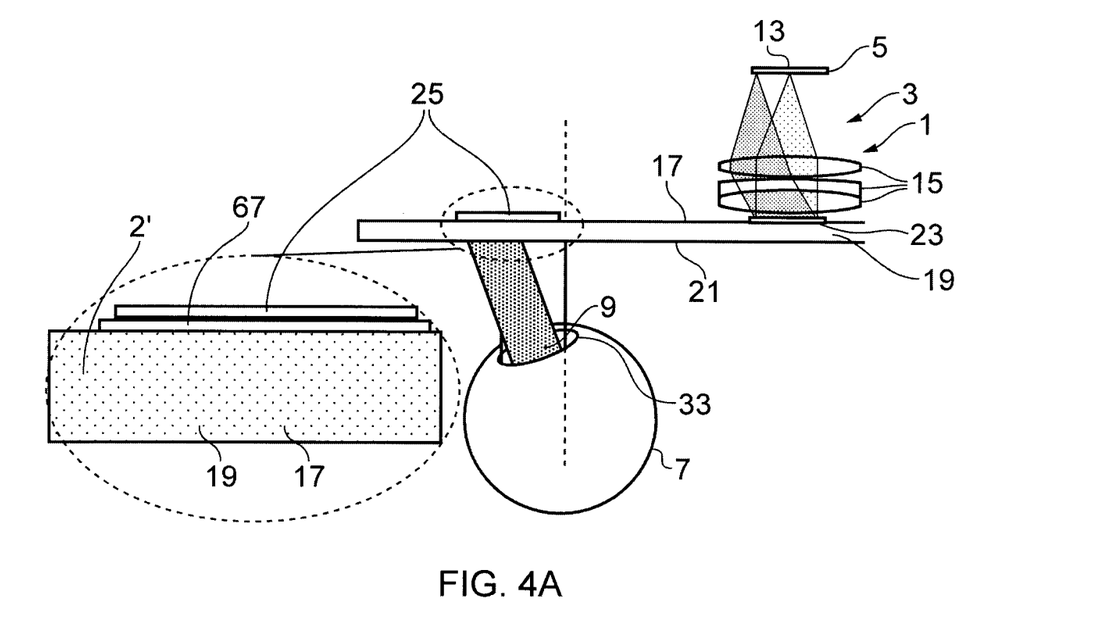
FIGS. 4A and 4B illustrate an apparatus according to a fourth exemplary embodiment of the disclosure.

FIG. 4A schematically illustrates an apparatus 1 according to a fourth exemplary embodiment of the disclosure. In FIG. 4A only the left hand side of the apparatus 1 has been illustrated for clarity. It is to be appreciated that the right hand side of the apparatus may be similar to the left hand side of the apparatus 1. In the exemplary embodiment illustrated in FIG. 4A the means for controlling the size and location of the exit pupil 9 may comprise means for controlling the position of a diffraction grating.

The apparatus 1 illustrated in FIG. 4A comprises an optical arrangement 3 similar to the optical arrangement 3 as described above in relation to FIG. 1. The optical arrangement 3 comprises an image source 5, one or more lenses 15 and a light guide element 17 as described above. The light guide element 17 may comprise an exit pupil expander 21 as described above. The optical arrangement 3 is arranged so that in use the exit pupil 9 of the optical arrangement 3 is provided proximate to the eye 7 of the user.

In the exemplary embodiment of FIG. 4A the first diffraction grating 23 is provided on the surface of a substrate 19. The first diffraction grating 23 may be in a fixed position relative to the substrate 19 so that the first diffraction grating 23 cannot move relative to the substrate 19.

In the exemplary embodiment of FIG. 4A the first diffraction grating 23 is positioned adjacent to the one or more lenses 15 so that the beam of light provided by the one or more lenses is coupled into the substrate 19.

In the exemplary embodiment of FIG. 4A the second diffraction grating 25 is provided separate to the surface of the substrate 19. In the exemplary embodiment of FIG. 4A a layer of fluid 67 may separate the second diffraction grating 25 from the substrate 19.

The layer of fluid may be configured to optically couple the second diffraction grating 25 to the substrate 19 so that light from the substrate 19 is provided to the second diffraction grating 25. The layer of fluid 67 may comprise any suitable material such as immersion oil.

The layer of fluid 67 may also be configured to enable the position of the second diffraction grating 25 to be moved relative to the substrate 19. The layer of fluid 67 may be configured to enable lateral movement of the second diffraction grating 25. This may enable the location of the second diffraction grating 25 on the surface of the substrate 19 to be changed. The change in position of the second diffraction grating 25 may enable the size and location of the exit pupil 9 of the optical arrangement 9 to be controlled.

The apparatus 1 may be configured so that the second diffraction grating 25 may be removed in response to an input signal. The input signal may be indicative of a detected position of a user's pupils 33. The input signal indicative of a detected position of a user's pupils 33 may be received from a detector 31. This may enable the exit pupil 9 of the optical arrangement 3 to be aligned with the pupil 33 of the user's eye 7 without any deliberate input from the user.

Figure 4B:
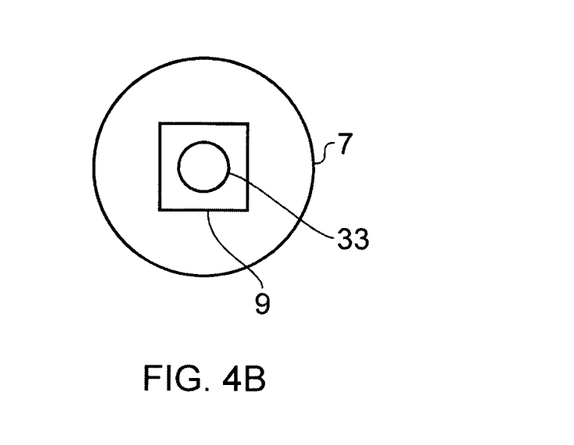

FIG. 4B illustrates the surface of the eye 7 of the user and indicates the area of the exit pupil 9.

In FIG. 4B the exit pupil 9 has a rectangular shape which the pupil 33 has a circular shape. In the exemplary embodiment of FIG. 4B the size of the exit pupil 9 has been controlled so that it is only slightly larger than the size of the pupil 33. The exit pupil 9 has been arranged so that the pupil 33 is located in the centre of the exit pupil 9.

Figure 5A:
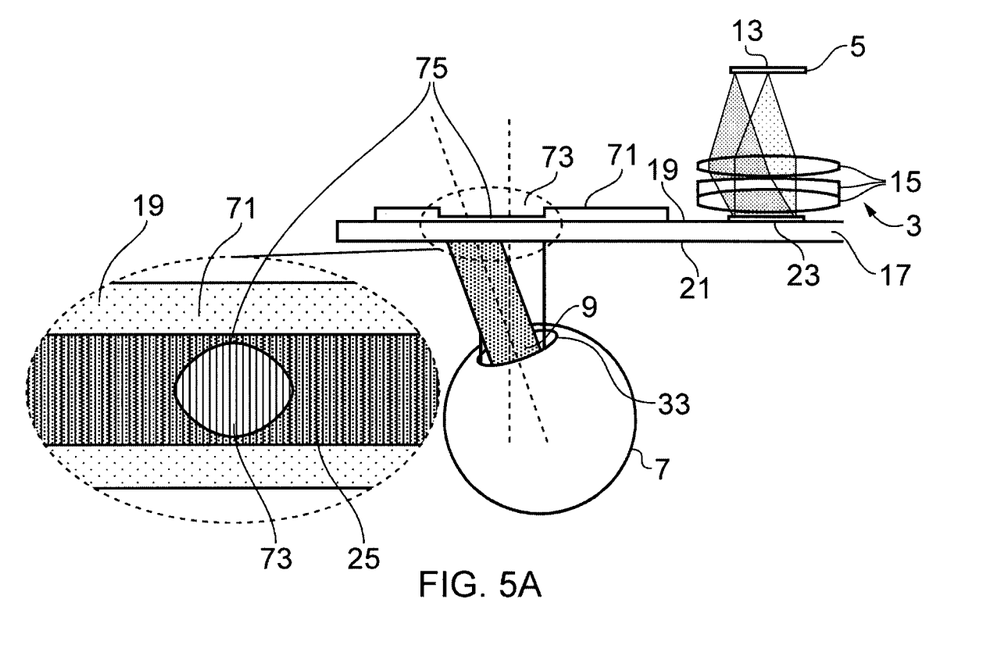
FIGS. 5A and 5B illustrate an apparatus according to a fifth exemplary embodiment of the disclosure.

FIG. 5A schematically illustrates an apparatus 1 according to a fifth exemplary embodiment of the disclosure. In FIG. 5A only the left hand side of the apparatus 1 has been illustrated for clarity. It is to be appreciated that the right hand side of the apparatus 1 may be similar to the left hand side of the apparatus 1. In the exemplary embodiment illustrated in FIG. 5A the means for controlling the size and location of the exit pupil 9 may comprise means for controlling a mask 69 overlaying a diffraction grating.

The apparatus 1 illustrated in FIG. 5A comprises an optical arrangement 3 similar to the optical arrangement 3 as described above in relation to FIGS. 1 and 4A. The optical arrangement 3 comprises an image source 5, one or more lenses 15 and a light guide element 17 as described above. The optical arrangement 3 is arranged so that in use the exit pupil 9 of the optical arrangement 3 is provided proximate to the eye 7 of the user.

In the exemplary embodiment of FIG. 5A a first diffraction grating 23 is provided on the surface of a substrate 19. The first diffraction grating 23 may be in a fixed position relative to the substrate 19 so that the first diffraction grating 23 cannot move relative to the substrate 19. In the exemplary embodiment of FIG. 5A the first diffraction grating 23 is positioned adjacent to the one or more lenses 15 so that the beam of light provided by the one or more lenses is coupled into the substrate 19.

In the exemplary embodiment of FIG. 5A a second diffraction grating 25 is also provided in the surface of the substrate 19. In the exemplary embodiment of FIG. 5A the second diffraction grating 25 may also be in a fixed position relative to the substrate 19 so that the second diffraction grating 25 also cannot move relative to the substrate 19.

In the exemplary embodiment of FIG. 5A a mask 69 is provided overlaying the second diffraction grating 25. The mask 69 comprises a non-diffractive portion 71. The non-diffractive portion 71 may be configured to so that light does not pass though the non-diffractive portion 71. The non-diffractive portion 71 may be configured prevent diffraction from the second diffraction grating 25 in the area of the second diffraction grating 25 which is covered by the mask 69. The non-diffractive portion 71 may be configured to ensure that light remains within the light guide element 17 due to total internal reflection but is not coupled out of the light guide 17.

The mask 69 also comprises a diffractive portion 73. The diffractive portion 73 may comprise a gap 75 within the non-diffractive portion 71. The diffractive portion 73 may be configured to enable light to be coupled out of the light guide element 17 though the second diffraction grating 25.

In some embodiments of the disclosure the mask 69 may be configured so that the size and/or location of the diffractive portion 73 may be changed. In some embodiments of the disclosure the means for changing the size and/or location of the diffractive portion 73 may comprise electrical means. In such embodiments an electrical input signal may be provided to the mask 69. The electrical input signal may cause a change in a physical property of the mask 69 and so change the size and/or location of the diffractive portion 73.

For example, in some embodiments of the disclosure the mask 69 may comprise an electrolyte. In such embodiments the surface of the substrate 19 on which the second diffraction grating 25 is provided may be configured to enable the electrowetting properties of the surface to be changed. The electrolyte may then be provided on the areas of the surface which may be configured to enable the electrowetting properties of the surface to be changed.

The electrolyte may have optical properties so that the beam of light does not pass out of the diffraction grating 25 in the regions where the electrolyte overlays the diffraction grating 25. In such regions a beam of light may be reflected back into the light guide 17, for example by total internal reflection. However the beam of light may still pass out of the diffraction grating 25 in the regions which are not covered by the electrolyte.

The electrolyte may be configured so that changing the voltage applied to the electrolyte may change the surface tension of the fluid and so change the area of the surface of the substrate 19 which is covered by the electrolyte. This may therefore change the region of the second diffraction grating 25 which is covered by the electrolyte and create a gap 75 in the electrolyte. The size and location of the gap 75 in the electrolyte may determine the size and location of the exit pupil 9. The size and location of the gap 75 in the electrolyte may be controlled by controlling the voltage applied to the v. This may enable the size and location of the exit pupil 9 to be controlled.

In other embodiments of the disclosure the means for changing the size and/or location of the transparent portion 73 may comprise mechanical means which may enable the physical position of the mask 69 to be moved with respect to the substrate 19.

Figure 5B:
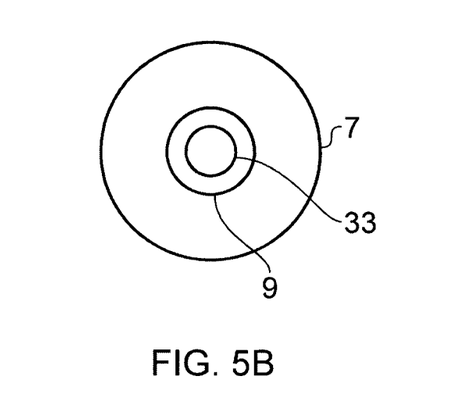

FIG. 5B illustrates the surface of the eye 7 of the user and indicates the area of the exit pupil 9.

In FIG. 5B the exit pupil 9 has a circular shape which the pupil 33 has a circular shape. In the exemplary embodiment of FIG. 5B the size of the exit pupil has been controlled so that it is only slightly larger than the size of the pupil 33. The exit pupil 9 has been located so that the pupil 33 is located in the centre of the exit pupil 9.

Figure 6A:
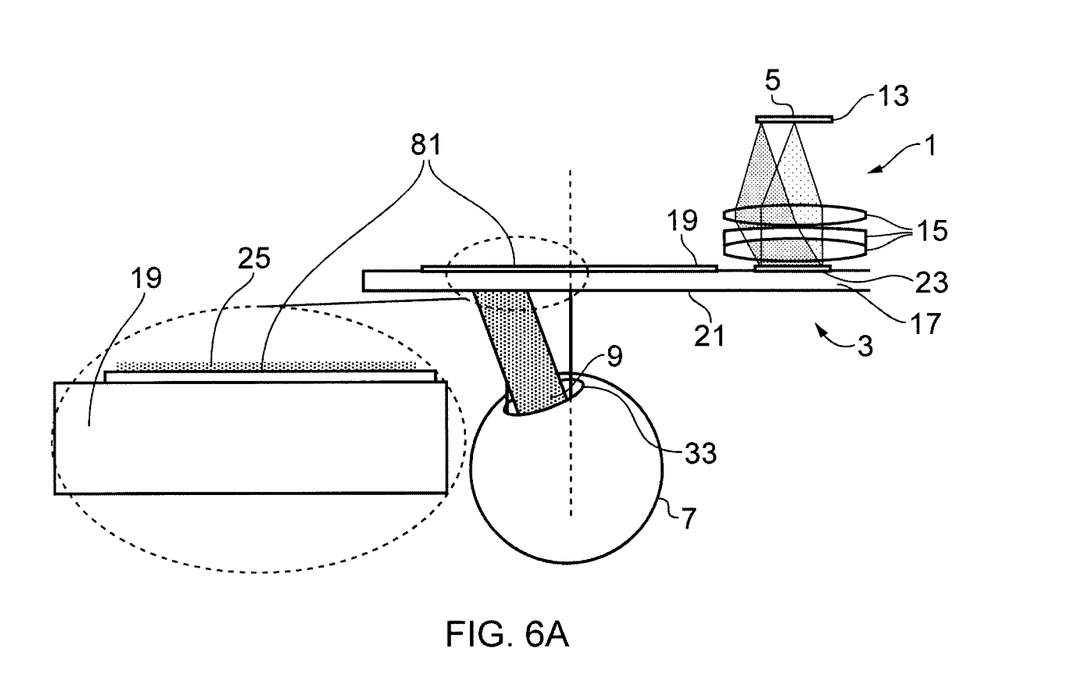
FIGS. 6A and 6B illustrate an apparatus according to a sixth exemplary embodiment of the disclosure.

FIG. 6A schematically illustrates an apparatus 1 according to a sixth exemplary embodiment of the disclosure. In FIG. 6A only the left hand side of the apparatus 1 has been illustrated for clarity. It is to be appreciated that the right hand side of the apparatus 1 may be similar to the left hand side of the apparatus 1. In the exemplary embodiment illustrated in FIG. 6A the means for controlling the size and location of the exit pupil 9 may comprise means for dynamically controlling the structure of a diffraction grating 25.

The apparatus 1 illustrated in FIG. 6A comprises an optical arrangement 3 similar to the optical arrangement 3 as described above in relation to FIGS. 1, 4A and 5A. The optical arrangement 3 comprises an image source 5, one or more lenses 15 and a light guide element 17 as described above. The optical arrangement 3 is arranged so that in use the exit pupil 9 of the optical arrangement 3 is provided proximate to the eye 7 of the user.

In the exemplary embodiment of FIG. 6A a first diffraction grating 23 is provided on the surface of a substrate 19. The first diffraction grating 23 may be in a fixed position relative to the substrate 19 so that the first diffraction grating 23 cannot move relative to the substrate 19. In the exemplary embodiment of FIG. 5A the first diffraction grating 23 is positioned adjacent to the one or more lenses 15 so that the beam of light provided by the one or more lenses is coupled into the substrate 19.

A layer of electro-active gel 81 is provided on the other end of the substrate. The electro-active gel may comprise a material which is configured to change shape in response to an electrical signal. The electro-active gel may comprise any suitable material such as a silicone fluid, for example, polydimethylsiloxane.

A second diffraction grating 25 may be formed in the layer of electro-active gel 81. As the shape of the electro-active gel is responsive to an electrical input signal, the size and location of the second diffraction grating 25 may be controlled by controlling the electrical input signal provided to the layer of electro-active gel 81. This may enable the size and location of the exit pupil 9 to be controlled.

Figure 6B:
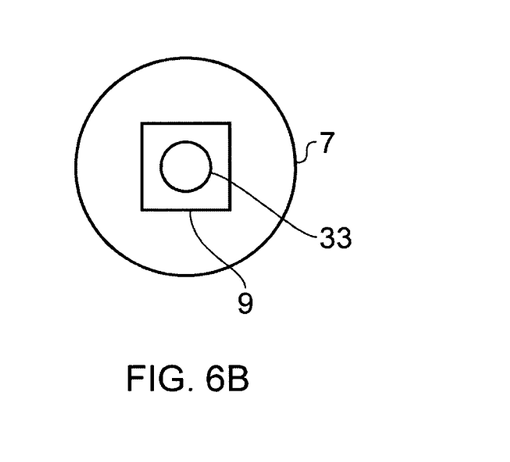

FIG. 6B illustrates the surface of the eye 7 of the user and indicates the area of the exit pupil 9.

In FIG. 6B the exit pupil 9 has a rectangular shape which the pupil 33 has a circular shape. In the exemplary embodiment of FIG. 6B the size of the exit pupil has been controlled so that it is only slightly larger than the size of the pupil 33. The exit pupil 9 has been located so that the pupil 33 is located in the centre of the exit pupil 9.

Figure 7:
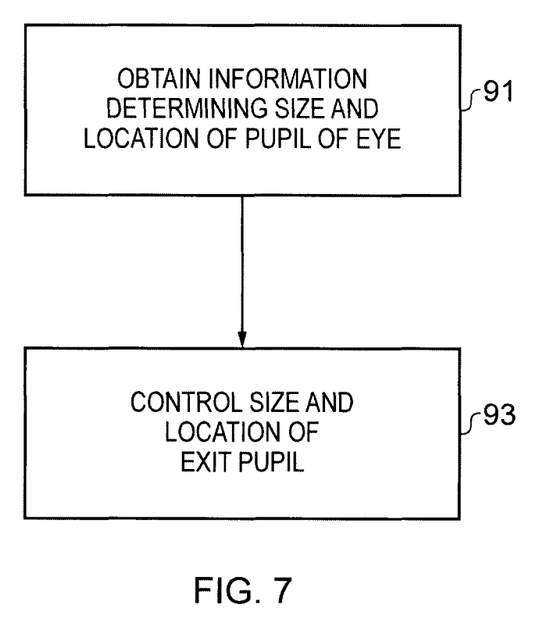
FIG. 7 illustrates a method according to an embodiment of the disclosure.

FIG. 7 illustrates a method according to an exemplary embodiment of the disclosure. The method may be performed by an apparatus 1 as described above in relation to any of FIGS. 1 to 6B.

At block 91 information is obtained determining the size and location of a pupil 33 of an eye 7 of a user of the apparatus 1. In some embodiments of the disclosure the information determining the size and location of a pupil 33 of an eye 7 of a user of the apparatus 1 may be obtained by a detector 31 which may be part of or coupled to the apparatus 1.

In other embodiments of the disclosure the information determining the size and location of a pupil 33 of an eye 7 of a user of the apparatus 1 may be obtained by a processor or other device which may be remote from the apparatus 1. In such embodiments the information may be provided to the apparatus 1 by any suitable communication link.

At block 93, in response to detecting the size and location of a pupil 33 of an eye 7 of a user of the apparatus 1, the size and location of the exit pupil 9 of the optical arrangement 9 is controlled. The size and location of the exit pupil 9 of the optical arrangement 9 may be controlled to align the exit pupil 9 of the optical arrangement 3 with the pupil 33 of the eye 7 of the user.

In some embodiments of the disclosure controlling the size and location of the exit pupil 9 may involve changing at least one of the size and location of the exit pupil 9. The apparatus 1 as described above in relation to FIGS. 2A to 6B may be used to control the size and location of the exit pupil 9. It is to be appreciated that other means could be used in other embodiments of the disclosure.

In some embodiments of the disclosure the apparatus 1 may comprise at least one processor; and at least one memory including computer program code the at least one memory and the computer program code configured to, with the at least one processor, cause the apparatus at least to perform: controlling a size and location of an exit pupil 9 of an optical arrangement 3 wherein the exit pupil 9 is configured to be positioned proximate to an eye 7 of a user to enable a user to view an image from the image source 5; and wherein the apparatus 1 is configured to control the size and location of the exit pupil in response to a determination of a size and location of a pupil of the eye.

The apparatus may comprise a controller which may be implemented using instructions that enable hardware functionality, for example, by using executable computer program instructions in a general-purpose or special-purpose processor that may be stored on a computer readable storage medium (disk, memory etc) to be executed by such a processor.

The apparatus 1 may comprise a processor which may be configured to read from and write to a memory. The processor may also comprise an output interface via which data and/or commands are output by the processor and an input interface via which data and/or commands are input to the processor.

The memory may be configured to store a computer program comprising computer program instructions that control the operation of the apparatus 1 when loaded into the processor. The computer program instructions may provide the logic and routines that enables the apparatus 1 to perform the methods illustrated in FIG. 7. The processor by reading the memory may be able to load and execute the computer program.

The processor may be configured to read from and write to the memory. The processor may also comprise an output interface via which data and/or commands are output by the processor and an input interface via which data and/or commands are input to the processor.

The memory may be configured to store a computer program comprising computer program instructions that control the operation of the apparatus when loaded into the processor. The computer program instructions provide the logic and routines that enables the apparatus to perform the method illustrated in FIG. 7. The processor by reading the memory is able to load and execute the computer program.

The computer program may arrive at the apparatus via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus may propagate or transmit the computer program as a computer data signal.

The memory may comprise a single component or it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific integrated circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIG. 7 may represent steps in a method and/or sections of code in the computer program. The illustration of a particular order to the blocks does not necessarily imply that there is a required or preferred order for the blocks and the order and arrangement of the block may be varied. Furthermore, it may be possible for some blocks to be omitted.

In the embodiments described above the term "coupled" means operationally coupled and any number or combination of intervening elements may exist between coupled components (including no intervening elements).

Embodiments of the disclosure as described above provide an apparatus 1 which may be used to control the size and location of the exit pupil of an optical arrangement 3 in response to the determination of the position of the user's pupil 33. This may enable the size and location of the exit pupil of the optical arrangement 3 to be aligned with the pupil 33 of the user even when the user is moving their eyes. This may reduce the size of the exit pupil 9 needed to ensure that the user can always view the images and so may provide a more efficient apparatus 1.

Although embodiments of the present disclosure have been described in the preceding paragraphs with reference to various examples, it should be appreciated that modifications to the examples given can be made without departing from the scope of the disclosure as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
at least one processor; and
at least one memory including computer program code, wherein the at least one memory and the computer program code are configured, with the at least one processor, to enable the apparatus to:
determine a size and location of a pupil of an eye of a user;
control a size and location of an exit pupil of a light guide element of an optical arrangement in response to determining the size and location of the pupil of the eye, wherein the optical arrangement comprises the light guide element, an image source, a first diffraction grating and a second diffraction grating, wherein the exit pupil is configured to be positioned proximate to the eye of the user to enable the user to view an image from the image source via a first operative portion of the first diffraction grating and a second operative portion of the second diffraction grating,
wherein the apparatus comprises a mechanism for moving at least one of the first operative portion of the first diffraction grating and the second operative portion of the second diffraction grating of the optical arrangement relative to the light guide element to enable the size and location of the exit pupil of the light guide element to be controlled in response to determining the size and location of the pupil of the eye.

2. An apparatus as claimed in claim 1 wherein the image source comprises at least one display.

3. An apparatus as claimed in claim 1 wherein the second diffraction grating is located on a substrate overlaying the light guide element and configured to allow the substrate to move relative to the light guide element.

4. An apparatus as claimed in claim 1 wherein the light guide element comprises a mask configured to at least partially cover the second diffraction grating wherein the mask is configured to allow the position of a diffractive portion of the mask to be moved relative to the second diffraction grating.

5. An apparatus as claimed in claim 4 wherein the mask comprises an electrolyte.

6. An apparatus as claimed in claim 1 wherein the exit pupil of the optical arrangement is changed from being a first size to being a second size by controlling a size and location of the second diffraction grating.

7. An apparatus as claimed in claim 1 wherein the apparatus comprises a detector configured to detect a size and location of a pupil of the eye.

8. An apparatus as claimed in claim 7 wherein the detector comprises an image capturing device configured to capture an image of the eye.

9. An apparatus as claimed in claim 8 wherein the image capturing device comprises a video image capturing device.

10. An apparatus as claimed in claim 8 wherein the detector comprises a processor configured to analyze images captured by the image capturing device to determine a size and location of the pupil of the eye.

11. An apparatus as claimed in claim 7 wherein the detector comprises a light source configured to illuminate the eye of the user using infrared light.

12. An apparatus as claimed in claim 1, wherein the second diffraction grating is separated from the light guide element by a layer of fluid, wherein the layer of fluid is configured to optically couple the second diffraction grating to the light guide element.

13. An apparatus as claimed in claim 12 wherein the layer of fluid is configured to enable the position of the second diffraction grating to be moved relative to the light guide element.

14. An apparatus as claimed in claim 1 wherein the second diffraction grating is formed in a layer of electro-active gel, wherein the electro-active gel is configured to change shape in response to an electrical input signal, wherein the size and location of the second diffraction grating is controlled by controlling the electrical input signal to the electro-active gel.

15. An apparatus as claimed in claim 1, wherein the first diffraction grating is configured to in-couple light to the light guide element from the image source;

wherein the second diffraction grating is configured to out-couple light to the exit pupil that has been totally internally reflected by the light guide element; and wherein the light guide element is configured to enable total internal reflection of the in-coupled light so that the light propagates from the first diffraction grating through the light guide element to the second diffraction grating.

16. A method comprising:

determining a size and location of a pupil of an eye of a user; and controlling a size and location of an exit pupil of a light guide of an optical arrangement in response to determining the size and location of the pupil of the eye, wherein the optical arrangement comprises the light guide element, a first diffraction grating and a second diffraction grating, wherein the exit pupil is configured to be positioned proximate to the eye of a user to enable the user to view an image from an image source via a first operative portion of the first diffraction grating and a second operative portion of the second diffraction grating, wherein the optical arrangement comprises a mechanism for moving at least one of the first operative portion of the first diffraction grating and the second operative portion of the second diffraction grating of the optical arrangement relative to the light guide element to enable the size and location of the exit pupil of the light guide element to be controlled in response to determining the size and location of the pupil of the eye.

17. A method as claimed in claim 16 wherein controlling the size and location of an exit pupil comprises moving at least an element of the optical arrangement relative to the eye of the user.

18. A method as claimed in claim 16 wherein the second diffraction grating is located on a substrate overlaying the light guide element and controlling the size and location of an exit pupil comprises moving the substrate relative to the light guide element.

19. A method as claimed in claim 16 wherein the light guide element comprises a mask configured to at least partially cover the second diffraction grating and controlling the size and location of an exit pupil comprises moving a position of a diffractive portion of the mask relative to the second diffraction grating.

20. A non-transitory computer-readable medium comprising a computer program comprising computer program instructions that, when executed by at least one processor, cause an apparatus at least to perform:

determining a size and location of a pupil of an eye of a user; and controlling a size and location of an exit pupil of a light guide element of an optical arrangement in response to determining the size and location of the pupil of the eye, wherein the optical arrangement comprises the light guide element, a first diffraction grating and a second diffraction grating, wherein the exit pupil is configured to be positioned proximate to the eye of the user to enable the user to view an image from an image source via a first operative portion of the first diffraction grating and a second operative portion of the second diffraction grating, wherein the apparatus comprises a mechanism for moving at least one of the first operative portion of the first diffraction grating and the second operative portion of the second diffraction grating of the optical arrangement relative to the light guide element to enable the size and location of the exit pupil of the light guide element to be controlled in response to determining the size and location of the pupil of the eye.

* * * * *